(No Model.) 2 Sheets—Sheet 1.

G. A. ADSIT.
SEED PLANTER.

No. 463,021. Patented Nov. 10, 1891.

Witnesses.
Chas. Beerdner.
P. A. Eastick

Inventor.
Geo. A. Adsit,
per R. F. Osgood.
Atty.

(No Model.) 2 Sheets—Sheet 2.
G. A. ADSIT.
SEED PLANTER.
No. 463,021. Patented Nov. 10, 1891.
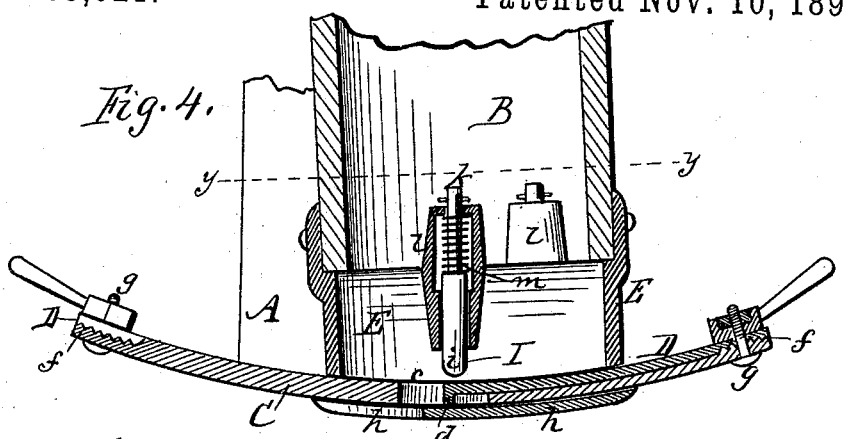
Fig. 4.
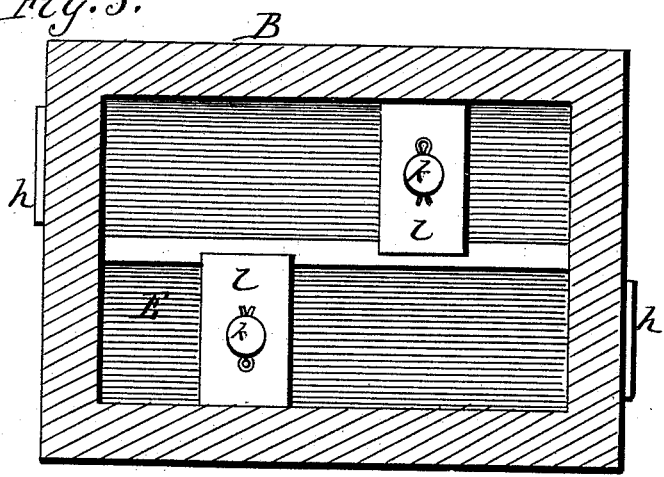
Fig. 5.
Fig. 7.
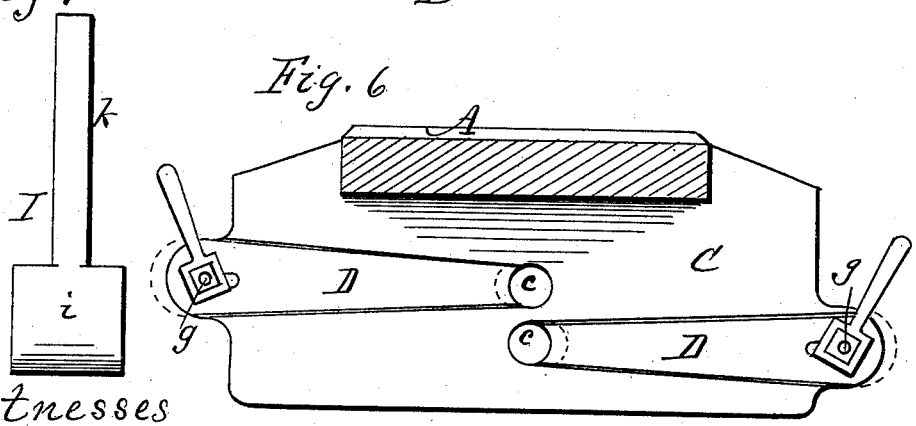
Fig. 6.
Witnesses
Chas. B. Widener,
P. H. Castich
Inventor:
Geo. A. Adsit,
pr R. F. Osgood, Atty

UNITED STATES PATENT OFFICE.

GEORGE A. ADSIT, OF ALBION, NEW YORK, ASSIGNOR TO THE CURTIS MANUFACTURING COMPANY, OF SAME PLACE.

SEED-PLANTER.

SPECIFICATION forming part of Letters Patent No. 463,021, dated November 10, 1891.

Application filed March 26, 1891. Serial No. 386,447. (No model.)

*To all whom it may concern:*

Be it known that I, GEORGE A. ADSIT, of Albion, in the county of Orleans and State of New York, have invented a certain new and useful Improvement in Seed-Planters; and I do hereby declare that the following is a full, clear, and exact description of the same, reference being had to the drawings accompanying this specification.

My improvement relates to that class of seed-planters in which the seed-tube that drops the seed swings around a pivot and over a delivery-plate, whereby the grains are dropped regularly and in given number to a hill.

The invention consists in the construction and arrangement of parts hereinafter described and claimed.

Figure 1:
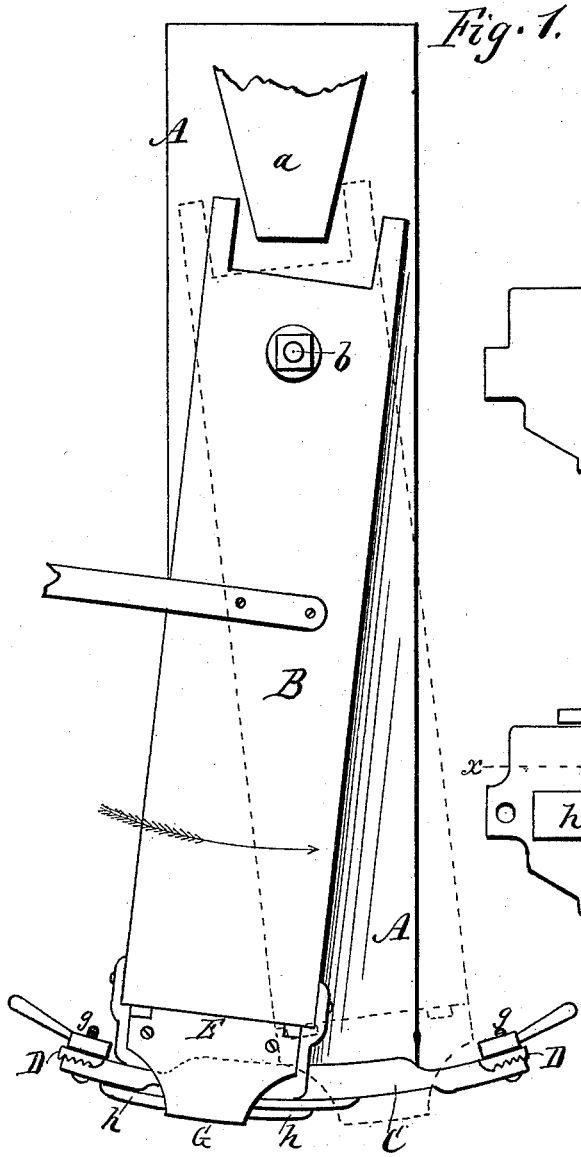
Figure 2:
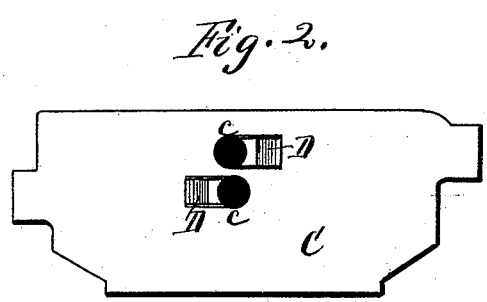
Figure 3:
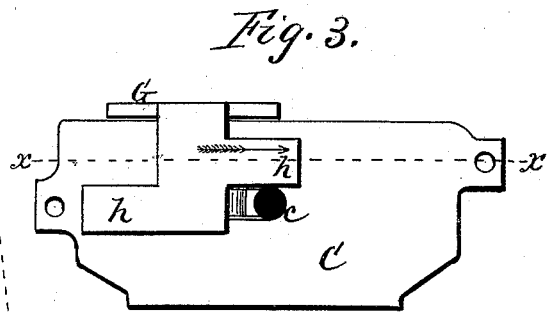

In the drawings, Figure 1 is a side elevation of one of the seed-discharging tubes and its connections. Fig. 2 is a bottom view of the delivery-plate C with the exterior slide removed. Fig. 3 is a similar view of the same part with the slide in place. Fig. 4 is a longitudinal vertical section of the lower end of the apparatus on an enlarged scale, the line of section being indicated by line $x\,x$, Fig. 3. Fig. 5 is an enlarged cross-section in line $y\,y$ of Fig. 4. Fig. 6 is a plan view of the delivery-plate C, and showing the gages by which the amount of seed dropped is regulated. Fig. 7 is an elevation of one of the devices for sweeping the surplus seed from the seed-dropping holes.

In this invention the devices for dropping the seed are suspended below the seed box or hopper, and are supplied from the seed-box by tubes $a\,a$, Fig. 1, or any equivalent devices.

A A are the stationary supports, and B B the swinging seed-tubes resting on pivots or bolts $b\,b$, attached to the stationary parts.

The above describes two sets of devices for dropping two rows at a time. The machine can be made to drop one row by using only one set of the dropping devices.

C is a stationary plate attached to the foot of the stationary support A. I denominate this the "delivery-plate," as it is provided with holes $c\,c$, through which the seed must pass in being dropped. This plate is provided with gages D D, which slide in and out endwise to gage the size of the holes $c\,c$. The holes are made long enough to allow the proper adjustment of the gages, and the latter preferably have lugs $d\,d$ at their inner ends, which rest and slide in the holes. This is shown in Fig. 4. At the outer end the gages D have a series of ratchet-teeth $f$ on their under sides, which engage with a single tooth that stands up from the bed-plate C. The ends of the gages are also slotted, and through the slots pass bolts $g\,g$, by which the gages are tightened at any adjustment. When the gages are so tightened, the ratchet prevents any slipping. The adjustment is indicated by the dotted lines in Fig. 6. By this means the size of the discharge-holes is made larger or smaller to be suited to the different sizes of grains and the number to be dropped into a hill.

E is a casting attached to the lower end of the swinging tube B and swinging with it. It is hollow and forms a continuation of the tube itself, allowing the seed which passes through the tube to fall onto the delivery-plate. The foot E is provided on one side with a right-angled guard-plate G, which passes around the outer edge of the delivery-plate C and projects under and embraces the same. On the under side this guard-plate is provided with two guards $h\,h$, which extend in opposite directions, resting closely under the delivery-plate C, each covering one of the delivery-holes $c$. The arrangement is such that at the extent of the stroke in either direction the guards uncover the holes and allow the seed to drop; but on the return motion they cover the holes and prevent the seed from dropping through. It should be stated here that the seed drops at each reverse stroke of the tube, dropping from one hole at one motion of the tube and from the other at the reverse motion, and this is so timed that the seed is dropped at regular intervals apart in the hills. The guards $h\,h$ keep the delivery-holes covered except at the end of the stroke, when they open them long enough to allow the seed to drop.

I I are clearers for leveling the seed in the seed-holes and sweeping off the surplus grains. They consist of devices in the form of plungers having a head $i$, with a rounded lower end that rests on top of the delivery-plate C, and a stem $k$, which extends up through a case $l$, attached to the foot of the swinging tube. In the case is a light coiled or other spring $m$, which presses down on the head of the clearer with just sufficient force to cause it to sweep the surplus seed from over the holes and yet rise under any undue resistance.

It is found in practice that these clearers are far more effective than the brushes in common use for the purpose, as they present a more positive surface for sweeping off the seed and yield readily to pass over any obstruction without breaking the seed. This machine is applicable in planting beans, corn, and all ordinary seeds which are planted in hills.

Having described my invention I do not claim, broadly, a swinging conductor, nor do I claim, broadly, cut-offs connected with such conductor for alternately dropping the seed.

What I claim as new, and desire to secure by Letters Patent, is—

1. In a seed-planter, the combination, with the swinging conductor B, of the stationary plate C, provided with seed-holes $c\ c$, located below the conductor, and the guard-plate G, attached to the foot of the conductor, extending around the outer edge of the plate and provided on the under side with the offset-guards $h\ h$, which alternately cover and uncover the seed-holes, as shown and described, and for the purpose specified.

2. In a seed-planter, the combination, with the stationary plate C, provided with the seed-holes $c\ c$, of the gages D D, fitted in grooves of the plate and extending to the outer ends of the same, said gages being provided with teeth at the outer ends, which engage with teeth of the plate, and clamps for securing the gages at any adjustment, as herein shown and described.

In witness whereof I have hereunto signed my name in the presence of two subscribing witnesses.

GEO. A. ADSIT.

Witnesses:
  JNO. H. WHITE,
  SAMUEL WILLYOUNG.